(12) United States Patent
Amano et al.

(10) Patent No.: US 9,703,689 B2
(45) Date of Patent: Jul. 11, 2017

(54) DEFECT DETECTION USING TEST CASES GENERATED FROM TEST MODELS

(71) Applicant: International Business Machines Corporation, Armonk, NY (US)

(72) Inventors: Tomio Amano, Kanagawa-ken (JP); Natsumi Kurashima, Tokyo (JP); Hirofumi Matsuzawa, Kanagawa-ken (JP); Rei Suginaka, Tokyo (JP); Masaru Yamamoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/932,138

(22) Filed: Nov. 4, 2015

(65) Prior Publication Data

US 2017/0123962 A1 May 4, 2017

(51) Int. Cl.
*G06F 9/44* (2006.01)
*G06F 11/36* (2006.01)

(52) U.S. Cl.
CPC ...... *G06F 11/3684* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 5,875,334 A | 2/1999 | Chow et al. | |
| 7,624,380 B2 | 11/2009 | Okada | |
| 7,996,819 B2 | 8/2011 | Okada | |
| 8,347,267 B2 | 1/2013 | Givoni et al. | |
| 8,745,697 B2 | 6/2014 | Sakakibara | |
| 9,053,238 B2 | 6/2015 | Krishnan et al. | |
| 9,104,810 B2 | 8/2015 | Zhang | |
| 2003/0065986 A1* | 4/2003 | Fraenkel | G06F 11/3006 714/47.2 |

(Continued)

OTHER PUBLICATIONS

Donn Le Vie, Jr., "Writing Software Requirements Specifications (SRS) TechWhirl", www.techwhirl.com, dated Aug. 29, 2010, printout available at http://techwhirl.com/writing-software-requirements-specifications/, 16 pages, at least as early as Jan. 21, 2013.

(Continued)

*Primary Examiner* — Chameli Das
(74) *Attorney, Agent, or Firm* — Isaac J. Gooshaw, Esq.; Heslin, Rothenberg, Farley & Mesiti, P.C.; George S. Blasiak, Esq.

(57) ABSTRACT

Detection of defects in an online system includes, for example, receiving, by one or more processor, a plurality of search conditions regarding a search screen of the online system, generating, by the one or more processor, a plurality of test models having factors based on the plurality of search conditions and levels having one or more of the search conditions, generating, by the one or more processor, a plurality of test cases based on the generated plurality of test models having the factors based on the plurality of search conditions and the levels having one or more of the search conditions, and executing, by the one or more processor, the plurality of test cases on the online system to detect defects in the online system.

19 Claims, 11 Drawing Sheets

(56) References Cited

U.S. PATENT DOCUMENTS

| | | | |
|---|---|---|---|
| 2006/0080040 A1* | 4/2006 | Garczarek | G01N 30/8624 |
| | | | 702/19 |
| 2006/0095378 A1* | 5/2006 | Aggarwal | G06F 17/30536 |
| | | | 705/51 |
| 2007/0043980 A1 | 2/2007 | Ohashi et al. | |
| 2008/0240369 A1* | 10/2008 | Allen | H04M 3/28 |
| | | | 379/27.04 |
| 2008/0255682 A1* | 10/2008 | Zhao | G05B 19/4184 |
| | | | 700/30 |
| 2009/0094213 A1* | 4/2009 | Wang | G06F 17/30867 |
| 2011/0208469 A1* | 8/2011 | Sheye | G06F 11/3668 |
| | | | 702/123 |
| 2012/0117088 A1* | 5/2012 | Kawakami | G06F 19/3443 |
| | | | 707/749 |
| 2012/0150759 A1* | 6/2012 | Tarjan | G06Q 30/02 |
| | | | 705/319 |
| 2012/0283991 A1* | 11/2012 | Oliner | G06F 11/0751 |
| | | | 702/186 |
| 2015/0356001 A1* | 12/2015 | Murugesan | G06F 11/3688 |
| | | | 717/124 |
| 2016/0092553 A1* | 3/2016 | Liu | G06F 17/30598 |
| | | | 707/738 |
| 2016/0155184 A1* | 6/2016 | Isaacson | G06Q 30/0633 |
| | | | 705/26.61 |
| 2016/0179599 A1* | 6/2016 | Deshpande | G06F 11/0745 |
| | | | 714/807 |

OTHER PUBLICATIONS

Jacek Czerwonka, "Pairwise Testing in the Real World: Practical Extensions to Test-Case Scenarios", Micorsoft Corporation, printout available on Aug. 11, 2015 at https://msdn.microsoft.com/en-us/library/Cc150619°28d=printer%29.aspx, 21 pages, Feb. 2008.

* cited by examiner

600

| Factor | Level |
|---|---|
| Search Key 1 | Artist name |
|  | Album title |
|  | Title of musical composition |
|  | Genre |
|  | Play list |
|  | Invalid artist name |
|  | Invalid album title |
|  | Invalid title of musical composition |
|  | Invalid genre |
|  | Invalid play list |
|  | Not specified |

630 — Search Key 1
640
650
660

| Factor | Level |
|---|---|
| Search Key 2 | 00 Not specified |
|  | 02 Album title |
|  | 03 Title of musical composition |
|  | 04 Genre |
|  | 05 Play list |

| Search Key 3 | 00 Not specified |
| --- | --- |
|  | 03 Title of musical composition |
|  | 04 Genre |
|  | 05 Play list |

| Search Key 4 | 00 Not specified |
| --- | --- |
|  | 04 Genre |
|  | 05 Play list |

| Search Key 5 | 00 Not specified |
| --- | --- |
|  | 05 Play list |

| The number of search conditions | 0 |
| --- | --- |
|  | 1 |
|  | 2 |
|  | 3 |
|  | 4 |
|  | 5 |

*FIG. 14*

DEFECT DETECTION USING TEST CASES GENERATED FROM TEST MODELS

TECHNICAL FIELD

The present disclosure relates generally to computer system testing, and more particularly, to defect detection using test cases generated from test models.

BACKGROUND

In the development of an information technology system, a test process is employed as a last phase for ensuring the quality of the system. During a test process, various kinds of tests are executed in an effort to detect defects in the system. Verification of the system depends on the quality of the tests cases. Creating quality test cases affects the schedule and cost of a development project, and ultimately, the quality of a development system.

SUMMARY

Shortcomings of the prior art are overcome and additional advantages are provided through the provision, in one embodiment, of a method for detecting defects in a online system. The method includes, for example, receiving, by one or more processor, a plurality of search conditions regarding a search screen of the online system, generating, by the one or more processor, a plurality of test models having factors based on the plurality of search conditions and levels having one or more of the search conditions, generating, by the one or more processor, a plurality of test cases based on the generated plurality of test models having the factors based on the plurality of search conditions and the levels having one or more of the search conditions, and executing, by the one or more processor, the plurality of test cases on the online system to detect defects in the online system.

In another embodiment, a computer program product is provided. The computer program product includes: a computer readable storage medium readable by one or more processor unit and storing instructions for execution by the one or more processing unit for performing a method for detecting defects in an online system. The method includes, for example, receiving a plurality of search conditions regarding a search screen of the online system, generating a plurality of test models having factors based on the plurality of search conditions and levels having one or more of the search conditions, generating a plurality of test cases based on the generated plurality of test models having the factors based on the plurality of search conditions and the levels having one or more of the search conditions, and executing the plurality of test cases on the online system to detect defects in the online system.

In a further embodiment, a system is provided. The system includes: a memory, and one or more processor in communication with the memory, where the system is configured to perform a method for detecting defects in an online system. The method includes, for example, receiving a plurality of search conditions regarding a search screen of the computer system, generating a plurality of test models having factors based on the plurality of search conditions and levels having one or more of the search conditions, generating a plurality of test cases based on the generated plurality of test models having the factors based on the plurality of search conditions and the levels having one or more of the search conditions, and executing the plurality of test cases on the computer system to detect defects in the computer system.

Additional features and advantages are realized through the techniques set forth herein. Other embodiments are described in detail herein and are considered a part of the claimed invention.

BRIEF DESCRIPTION OF THE DRAWINGS

One or more embodiments of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 9-13 are embodiments of tables of factor and level setting of the present invention based on the search screen of the specification document of FIG. 8;

FIG. 14 is an embodiment of a table of the number of search conditions based on the search screen of the specification document of FIG. 8.

DETAILED DESCRIPTION

Figure 1:
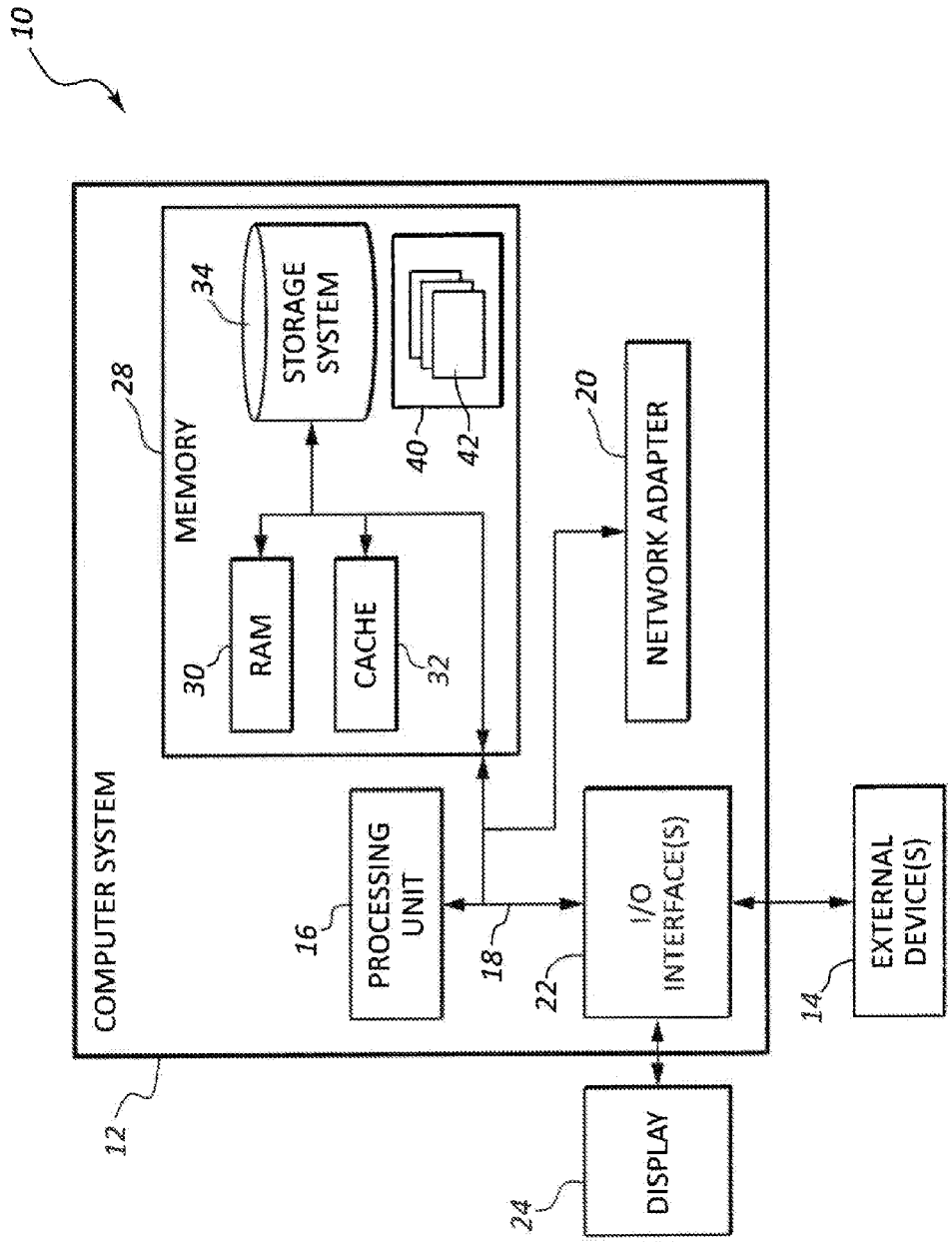
FIG. 1 depicts a cloud computing node according to an embodiment of the present invention.

Embodiments of the present disclosure and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the disclosure in detail. It should be understood, however, that the detailed description and the specific examples, while indicating embodiments of the invention, are given by way of illustration only, and not by way of limitation. Various substitutions, modifications, additions, and/or arrangements, within the spirit and/or scope of the underlying inventive concepts will be apparent to those skilled in the art from this disclosure.

The present disclosure provides, in part, methods, systems, and computer program products, network devices, and virtual machine management software that may offer technical advantages including ensuring the quality of created test models and test cases, and improving the efficiency and quality of a test phase in software development to ensure the quality of a test target online system.

In certain embodiment, the present disclosure may be applicable to testing of search screens of an online system. As described in greater detail below, the search conditions in a search screen are set as "levels", and not as "factors", which allows a reduction or a minimum number of test models, and thus, the number of test cases, while ensuring comprehensiveness of the search function of the search screen. For example, rules are provided for uniquely creating factors and levels from, for example, a specification document such as a search screen of an online system for generating test models and test cases. In one embodiment, in order to ensure comprehensiveness of cases for verifying a search function, the search conditions are combined, factors having a search condition are set as a levels such that the number of the factors is the same as the number of search conditions that can be simultaneously specified. Restriction conditions may be specified for eliminating unnecessary combinations. The test models may be provided to the systems for detecting defects. Implementing the technique of the present invention may enhance the performance of generating test models, test cases, and testing of an online system, thereby increasing the efficiency of the system as a whole.

FIGS. 1-4 depict various embodiments of computing, including cloud computing, in accordance with one or more embodiments set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
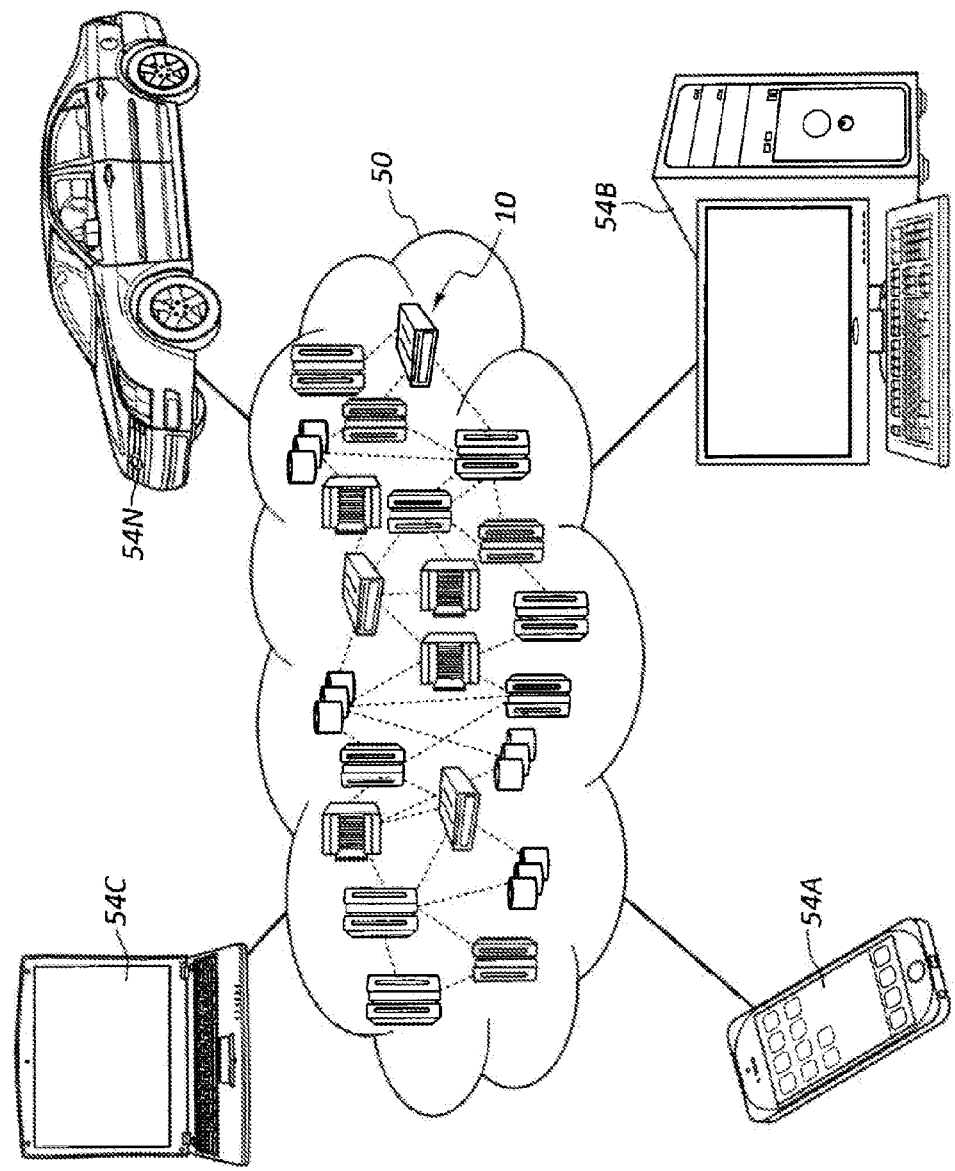
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
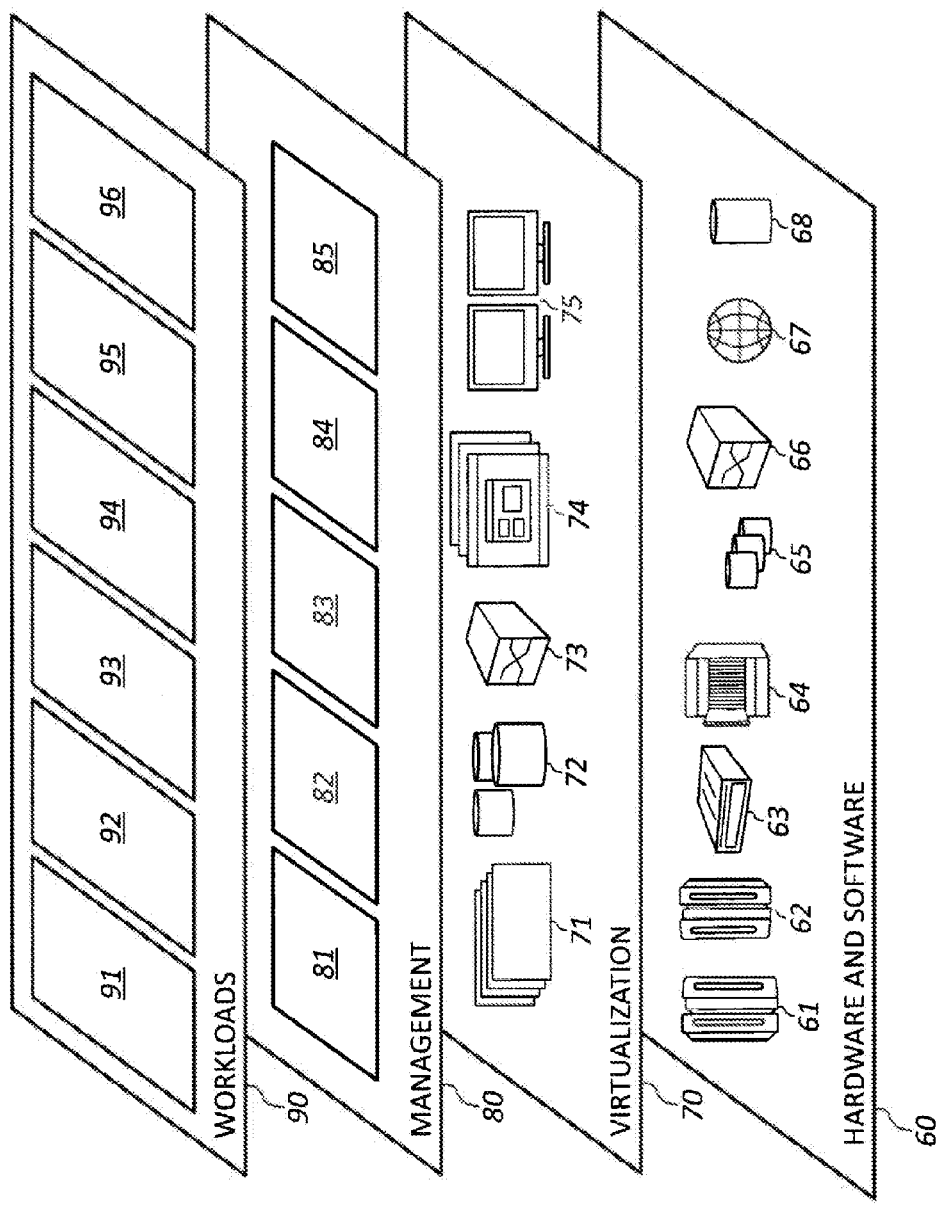
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and test model resources 96 as described herein.

Figure 4:
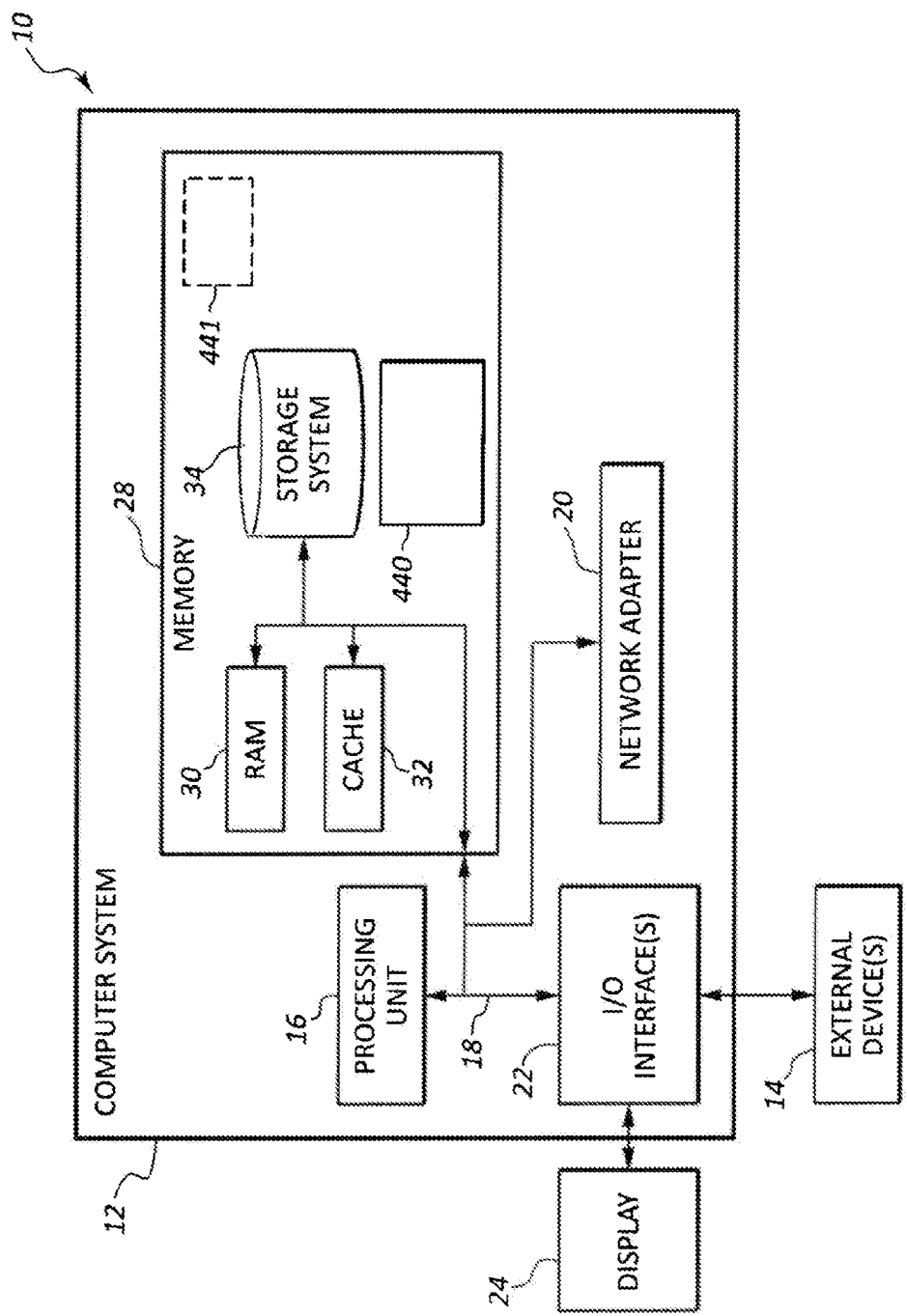
FIG. 4 depicts a hardware overview of a computing node, which may be a cloud computing node, in accordance with one or more embodiments set forth herein.

FIG. 4 depicts a hardware overview of a computing node 10, which may be a cloud computing node, in accordance with one or more embodiments set forth herein. The computing node as set forth in FIG. 4 can include the hardware components as set forth in reference to computing node 10 as set forth in reference to FIG. 1. By way of example, computing node 10 may generally be any of the computing devices described herein, such as network devices, client computers, server computers, etc.

Program/utility 40 as set forth in FIG. 1 can provide the functionality of test model resources 96 as set forth in FIG. 3. Program/utility 40 as set forth in FIG. 1 can include one or more program 440 as set forth in FIG. 4, and program/utility 40 as set forth in FIG. 1 can optionally include some or all of one or more program 441.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 (and optionally at least one of one or more program 441) can generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media, (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement embodiments of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
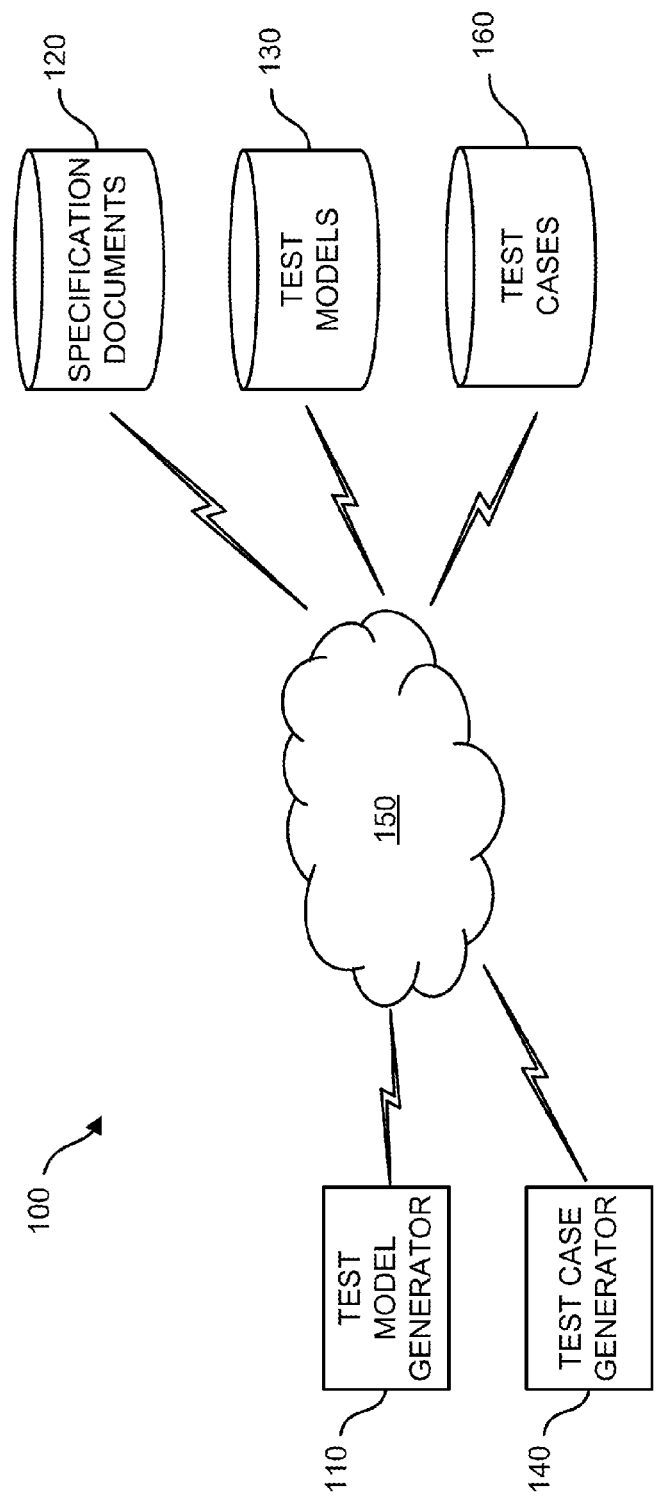
FIG. 5 is an exemplary block diagram of a system, in accordance with one or more embodiments set forth herein.

FIG. 5 is an exemplary block diagram of a system 100, in accordance with one or more embodiments set forth herein. For example, network 150 may be a physical network or a virtual network. A physical network can be, for example, a physical telecommunications network connecting numerous computer nodes or systems, such as computer servers and computer clients. By contrast a virtual network can, for example, combine numerous physical networks or parts thereof into a logical virtual network. In another example, numerous virtual networks can be defined over a single physical network.

By way of explanation, FIG. 5 depicts an example environment in which one or more test model generator 110 is operable for automatically generating test modes. In one example, test model generator 110 may be in communication with one or more specification document database 120. The specification documents stored in specification documents database 110 may include one or more search screens. As described in greater detail below, test model generator 100 may be effective for automatically generating test model cases based on a search screen of a specification document which test models may be stored in a test model database 130. A test case generator 140 may be effective for generating a plurality of test cases for use in testing information systems. The plurality of test cases may be stored in a test case database 160. Test model generator 110, specification document database 120, test model database 130, test case generator 140, and test case database 160 shown as being in communication via a network 150 can alternatively be co-located at test model generator 110.

Figure 6:
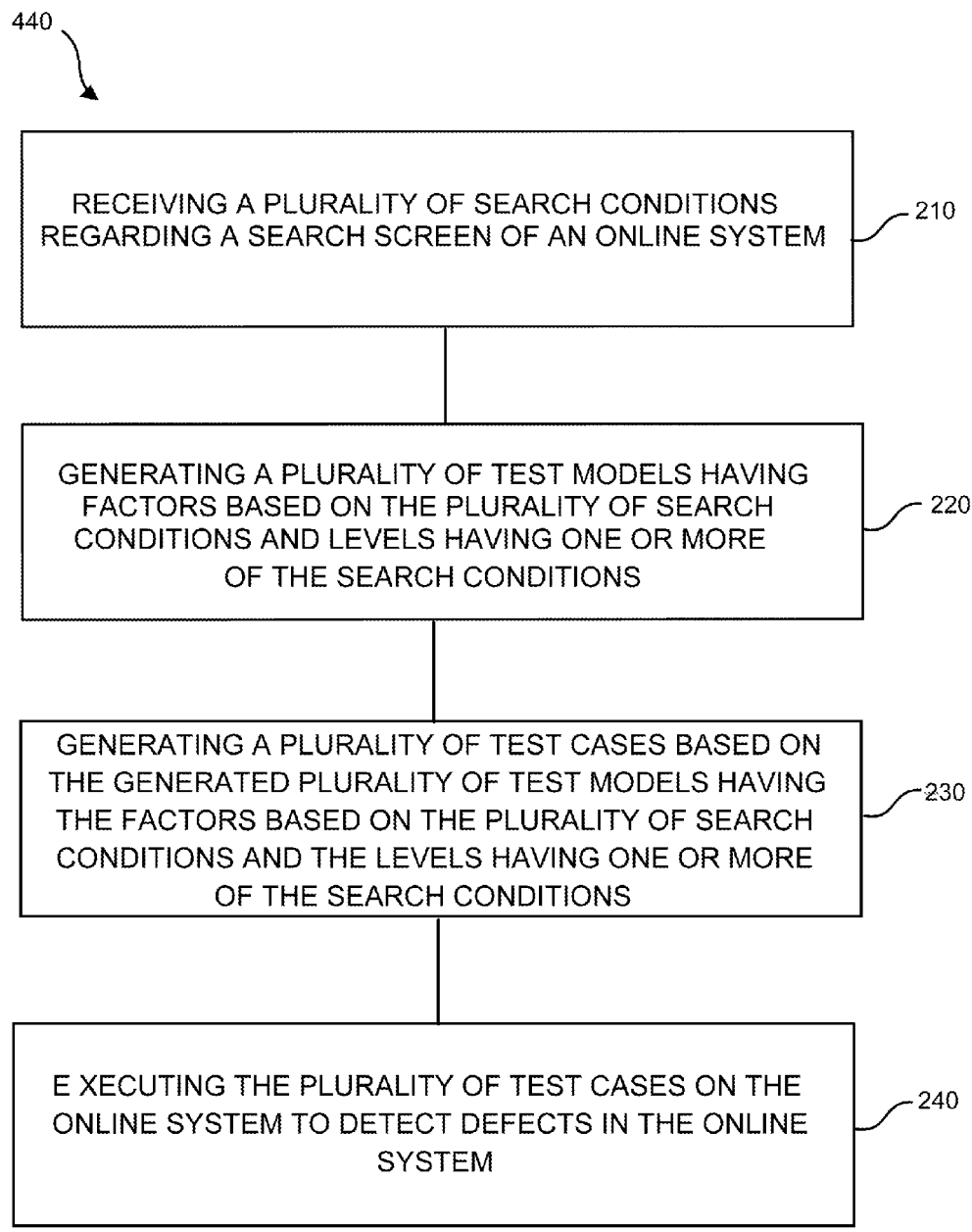
FIG. 6 illustrates a process in accordance with embodiments of the present disclosure.

FIG. 6 illustrates a process for detecting defects in an online system in accordance with embodiments of the present disclosure. By way of example, the processes described with respect to FIG. 6 can be performed using one or more program 440 (FIG. 4) on one or more test generator 100 (FIG. 5), as detailed with respect to FIG. 4.

For example, one or more program 440 may include at 210, receiving a plurality of search conditions regarding a search screen of an online system, at 220, generating a plurality of test models having factors based on the plurality of search conditions and levels having one or more of the search conditions, at 230 generating a plurality of test cases based on the generated plurality of test models having the factors based on the plurality of search conditions and the levels having one or more of the search conditions; and at 240 executing the plurality of test cases on the online system to detect defects in the online system.

Figure 7:
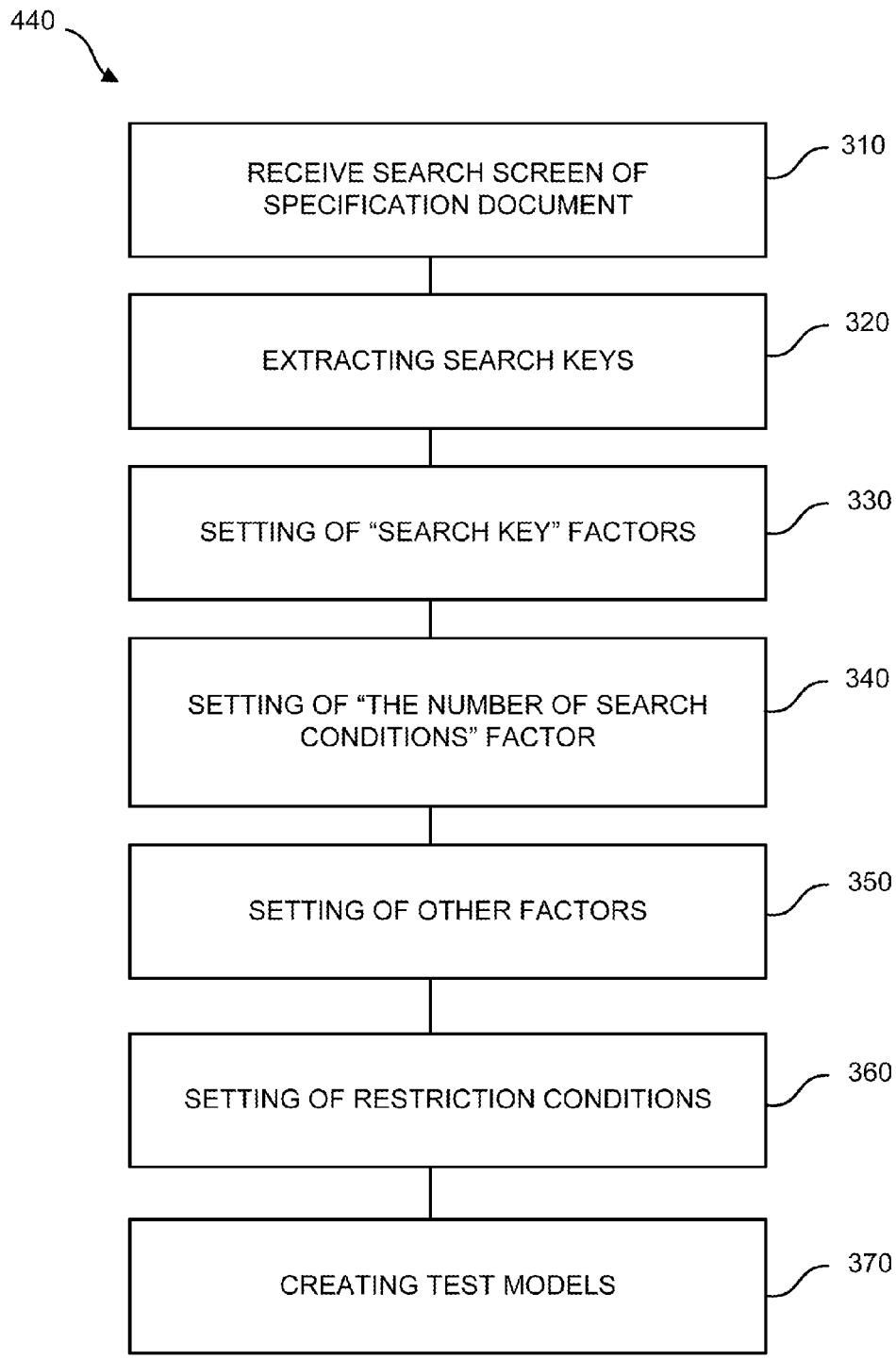
FIG. 7 illustrates a process in accordance with embodiments of the present invention.

FIG. 7 illustrates a process for automatically generating test models based on a search screen of a specification document for use in testing information systems in accordance with embodiments of the present disclosure. By way of example, the processes described with respect to FIG. 7 can be performed using one or more program 440 (FIG. 4) on one or more test model generator 110 (FIG. 5), as detailed with respect to FIG. 4.

Referring to the flow diagram of FIG. 7, for example, one or more program 440 may include at 310 extracting search keys based on the plurality of search conditions in the specification document, at 320 setting of "search key" factors, at 330 setting of "the number of search condition" factor, at 340, setting other factors, at 350 setting of restriction conditions, and at 360 creating test cases.

FIGS. 8-14 diagrammatically illustrate an embodiment of a process for automatically generating test models based on a search screen of a specification document for use in test cases for testing information systems, which may be performed by using one or more program 440 (FIG. 4) on one or more test model generator 110 (FIG. 5), as detailed with respect to FIG. 4.

Figure 8:
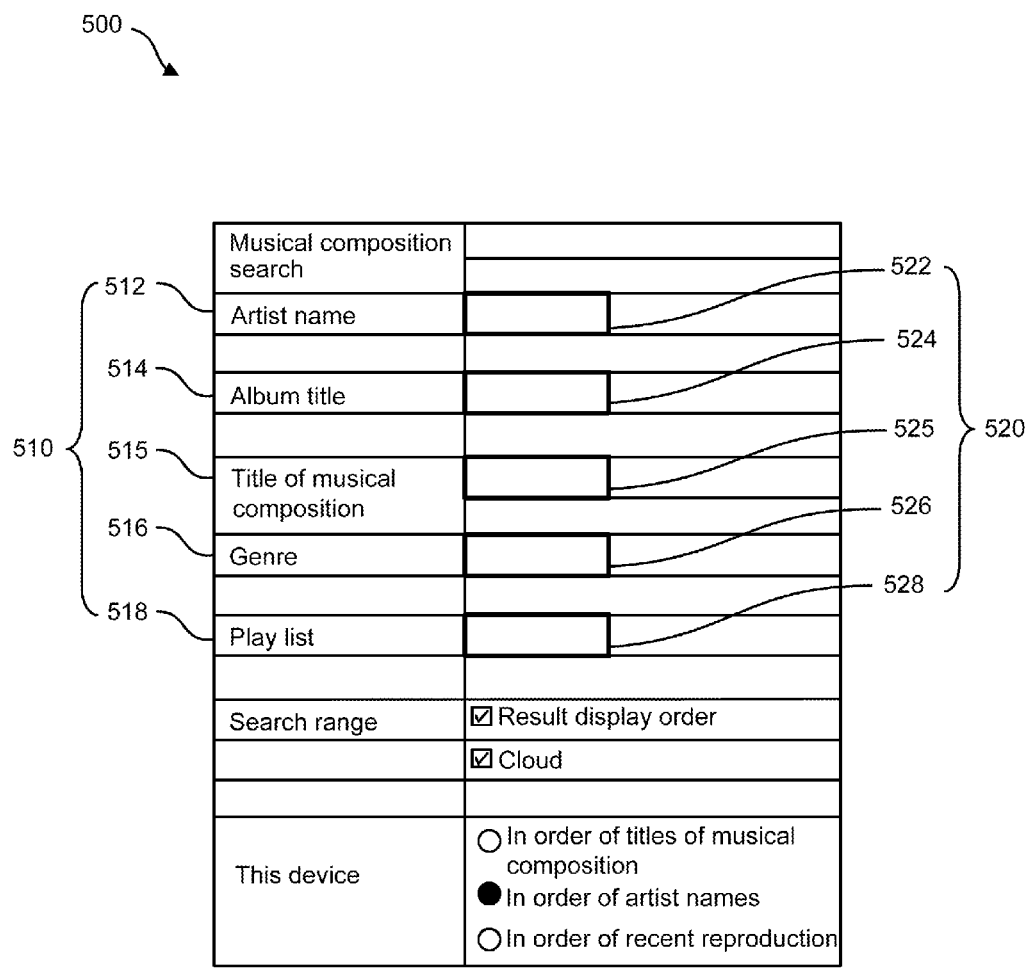
FIG. 8 is an illustration of an embodiment of a search screen of a specification document.

Initially, FIG. 8 illustrates an exemplary search screen 500 of a specification document for conducting a musical composition search. Search screen 500 may include a plurality of labeled search fields or search conditions 510, and corresponding input fields 520 for entering data regarding the search conditions. For example, the labeled search fields may include an "Artist name" 512 and a corresponding input field 522, an "Album title" 514 and a corresponding input field 524, a "Title of musical composition" 515 and a corresponding input field 525, a "Genre" 516 and a corresponding input field 526, and/or "Play list" 518 and a corresponding input field 528. For example, the input fields are for entering data used for searching a database of the IT system.

In the extraction of search keys, for example the plurality of search conditions, e.g., "Artist name", "Album title", "Title of musical composition", "Genre", and/or "Play list" are extracted from search screen 500 of the specification document. In the setting of "search key" factors, for example, select combinations of factors and levels may be based on the search conditions such as search conditions extracted from search screen 500. For example, as shown in FIG. 9, a first factor and associated levels table 600 may include a first factor 630 such as "Search Key 1" and the search conditions such as the extracted search condition which are set as levels 640. Additional levels 650 may include the situation of setting an invalid value for each search key. A further level 660 may be identified as "Not specified." In this test model, all the levels may be included. In addition, not only in the case of specifying a valid condition for each search key but also in the case of specifying an invalid condition or not specifying a search key, may correspond to at least one test model. Further in this case, a test model specifying an invalid search key is identified as an error case that cannot be combined with another factor to conduct a test.

FIGS. 10-13 illustrates additional factor and associated levels tables 700, 800, 900, and 1000. Where multiple of search functions are provided, a second and succeeding Search Keys are set as additional factors in order to include test models for verifying a search function in which multiple search keys are combined. For example, a Search Key 2 up to Search Key n (with n being the maximum number value of the number of search conditions that can be simultaneously specified) are set as factors. Search Key 2 factor and succeeding factors may include search condition items and "Not specified" as levels. An invalid condition may not be set as a level. Since it is not possible or desirable to specify the same search condition twice, the number of levels a factor has is decreased by one each time a Search Key is added. For example, a combination of test models such as having both Search Key 1 and Search Key 2, which specify Album title is eliminated, and the number of combinations can be reduced. All the factors may have "Not specified" as a level in addition to input item names for search. Thus, the situation where the number of specified search key items or search conditions is one, the situation where combination of two search key items or search conditions is specified, the situation where combination of three search key items or search conditions is specified, . . . and the situation where the number of specified search key items or search conditions is the maximum value, that is, combination of all search key items or search conditions, is specified can be included for example, as shown in the tables of FIGS. 9-13, and used as test models.

In the setting of "the number of search conditions" factor, for example, in order to determine the number of search conditions to be simultaneously specified for use in the test models, the number of search conditions is specified as a factor, e.g., from one up to the maximum value. As for levels, integers from 0, that is, in the case of specifying no search key or search condition (an error case) up to the maximum value of the number of search keys or search condition items n that can be simultaneously specified are set.

Where the number of search key or search condition that can be simultaneously specified is large, the number may be reduced, and, for example, 0, 1, N and the total number may be set. FIG. 14 illustrates a table corresponding to the setting the "number of search conditions" factor and levels.

In the setting of other factors, in addition to search conditions, verification items may be included in the test models, such as options at the time of search may be added as factors. As for functions that do not have a direct cause-and-effect relationship with a search function, such as a screen transition and help functions, they are not included in the test models since they can be separately verified. That is, they are not set as factors in this exemplary test model.

One additional factor may include conditions to be necessarily specified at the time of search such as with radio buttons, checkboxes, and the like. For search options that are not controlled by the number of search conditions, they may be regarded as independent factors, and values that they can take are set as levels. Another additional factor may include the number of search results. For example, the number of search results may be set as a factor. As levels, 0, 1 and multiple results may be set. If there is an upper limit of the number of search results to be displayed, "upper limit-1", "upper limit" and "exceeding upper limit" may be added as levels. If the number of pages of a search result list is restricted, "the number of results that can be displayed on one page", "the number of results displayed on two pages", and "the number of results displayed on three or more pages" may be set as levels. Another additional factor may include search result display options (e.g., sort order and the like). If there are options related with the search result display and the like, the option may be added as factors. For example, each of the maximum number of results displayed, sort order, and the like may be a factor, and variation of a value that each can take may be set as a level. There is set forth herein a method for detecting defects in an online system, the method comprising: receiving, by one or more processor, a plurality of search conditions regarding a search screen of the online system; generating, by the one or more processor, a plurality of test models having factors based on the plurality of search conditions and levels having one or more of the search conditions; generating, by the one or more processor, a plurality of test cases based on the generated plurality of test models having the factors based on the plurality of search conditions and the levels having one or more of the search conditions; and executing, by the one or more processor, the plurality of test cases on the online system to detect defects in the online system. There is also set forth herein the method described wherein the receiving comprises receiving at least one non-search conditions from the search screen of the specification document, and the generating comprises generating the plurality of test models having the at least one non-search condition as a factor and values of the non-search condition comprising levels.

In the setting of restrictions, at the time of combining levels of factors to set test models, restrictions for eliminating invalid combinations and unnecessary combinations may be considered. In one example, restrictions may be based on the number of search conditions. For example, in the case of Search Key 1=Not specified, necessarily Search Key 2=Not specified. In the case of Search Key 2=Not specified, necessarily Search Key 3=Not specified. In the case of Search Key 3=Not specified, necessarily Search Key 4=Not specified, and so forth. In another example, restrictions may be based on preventing the same search key appearing in search conditions. For example, in the case of Search Key 2≠Not specified, necessarily Search Key 1<Search Key 2. In the case of Search Key 2≠Not specified, necessarily Search Key 2<Search Key 3. In the case of Search Key 3≠Not specified, necessarily Search Key 3<Search Key 4, and so forth. In another example, restrictions may be based on the number of search conditions and Search Keys. For example, the number of search conditions is equal to "the number of factors taking a level other than "Not specified" among factors of Search Key 1 to Search Key n (where n is the maximum value)."

In the creation of test cases, test cases may be created by combining the factors and levels that have been extracted. An existing combinatorial testing tool can be used to create combinations. In the combinations, the levels of all the factors only have to be necessarily used once. In the case of a combination tool using an all-pairs method (also referred to as a pairwise method) or an orthogonal method, attention should be paid to the number of test cases may be larger than expected.

The process of extracting keywords (item names) to be candidates for factors and levels from a specification document may be automated by using an existing language analysis tool. In the present disclosure, it becomes possible to further define the extracted keywords as factors/levels that will be inputs to a tool used in a succeeding process. By implementing this as a test modeling tool, it becomes possible to generate test cases from a specification document using an existing combinatorial testing tool.

Figure 15:
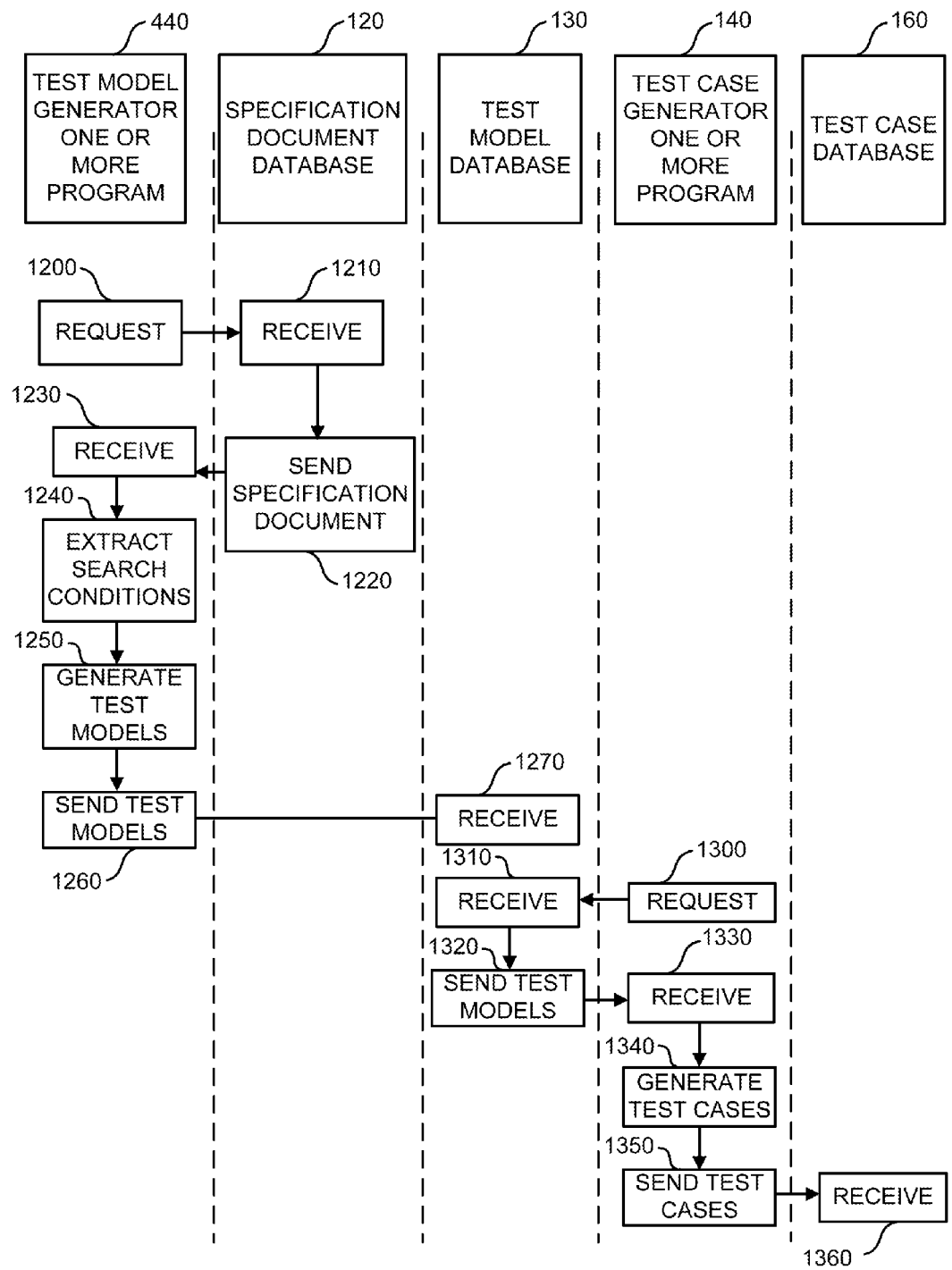
FIG. 15 is a diagram illustrating further embodiments of the present invention.

FIG. 15 is a diagram illustrating further embodiments of a process for automatically generating test cases based on a search screen of a specification document for use in testing information systems in accordance with one or more embodiments set forth herein. By way of explanation, in FIG. 15, processes are illustrated from the point of view of test model generator one or more program 440 (e.g., test model generator one or more programs 440 or 441 running on test model generator 110 of FIG. 5), a specification document database 120 (e.g., such as specification document database 120 of FIG. 5), a test model database 130 (e.g., such as test model database 130 of FIG. 5), test case generator one or more program 440 (e.g., test case generator one or more programs 440 or 441 running on test case generator 140 of FIG. 5), and a test case database 160 (e.g., such as test model database 130 of FIG. 5). Interface of the test model generator one or more program 440 can be presented locally, e.g., of specification document database 120 and output test model database 120, or externally, e.g., on a computing node 10 (FIGS. 1 and 4) external to specification document database 120 and output test model database 130.

In one or more embodiments, one or more program 440 may run on a different collection of physical or virtual machines or processors, depending on the need for scalability of the system. In one specific example, one or more program 440 could run on a single multiprocessor server system. In another specific example, various portions of one or more program 440 may run on different processors running on different computing nodes.

By way of overview, FIG. 15 illustrates, at least in part, one embodiment for automatically generating test model based on a search screen of a specification document for use in testing information systems. It will be understood that based on a different set or order of inputs one or more program 440 can provide different functionality than the functionality described with reference to FIG. 15.

Initially, a test model generator one or more program 440 may send at block 1200 a request for a search screen of a specification document to specification document database 120, which request is received at block 1210. At block 1220, a search screen of a specification document is sent from specification document database 120 and received at block 1230 at test model generator one or more program 440.

At block 1240, test model generator one or more program 440 may extract the search keys such as based on the search conditions in the search screen, and automatically generate test models at block 1250. At block 1260, the test models may be sent to test model database 130 which is received a block 1270.

A test case generator one or more program 140 may send at block 1300 a request for a test modes to test model database 130, which request is received at block 1310. At block 1320, a test models are sent from test model database 130 and received at block 1330 at test case generator one or more program 140. At block 1340, test case generator one or more program 140 may automatically generate test cases, which are sent at block 1350 to test case database 160 which is received a block 1360.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment chosen and described in order to best explain the principles of one or more embodiments set forth herein and the practical application, and to enable others of ordinary skill in the art to understand one or more embodiments as described herein for various embodiments with various modifications as are suited to the particular use contemplated.

The invention claimed is:

1. A method for detecting defects in an online system, the method comprising:

receiving, by one or more processor, a plurality of search conditions regarding a search screen of the online system;

generating, by the one or more processor, a plurality of test models having factors based on the plurality of search conditions and levels having one or more of the search conditions;

generating, by the one or more processor, a plurality of test cases based on the generated plurality of test models having the factors based on the plurality of search conditions and the levels having one or more of the search conditions; and executing, by the one or more processor, the plurality of test cases on the online system to detect defects in the online system;

wherein the receiving comprises receiving at least one non-search conditions from the search screen of a specification document, and the generating comprises generating the plurality of test models having the at least one non-search condition as a factor and values of the non-search condition comprising levels.

2. The method of claim 1 wherein the receiving comprises extracting the search conditions from the search screen.

3. The method of claim 1 wherein the search screen comprises a search screen of a specification document.

4. The method of claim 1 wherein the generating comprises generating the plurality of test models wherein a factor of each test model is based on a different one of the plurality of search conditions.

5. The method of claim 1 wherein the generating comprises generating the plurality of test models wherein a factor of each test model is based on a different one of the plurality of search conditions, and the levels for each factor comprises a different combination of the plurality of search conditions.

6. The method of claim 1 wherein a number of the plurality of test models is equal to the number of search conditions.

7. The method of claim 1 wherein at least one of the plurality of test models comprises a factor with all of the search conditions as levels.

8. The method of claim 1 further comprising transferring, by the one or more processor, the test cases to the online system.

9. The method of claim 1 wherein the generating the plurality of test cases is based on an all-pairs testing method or an orthogonal method.

10. The method of claim 1, wherein the receiving comprises extracting the plurality of search conditions from the search screen, and wherein the generating the plurality of test models is performed automatically in response to the performing of the receiving.

11. The method of claim 1, wherein the receiving comprises extracting the plurality of search conditions from the search screen, and wherein the generating the plurality of test models is performed automatically in response to the performing of the receiving, and wherein the generating the plurality of test cases is performed automatically in response to the performing of the generating the plurality of test models.

12. The method of claim 1, wherein the receiving comprises automatically extracting the plurality of search conditions from the search screen, wherein the search screen is a search screen of a specification document stored in a specification document database.

13. The method of claim 1, wherein the receiving comprises automatically extracting the plurality of search conditions from the search screen, wherein the search screen is a search screen of a specification document stored in a specification document database, and wherein the generating the plurality of test models is performed automatically in response to the performing of the receiving, and wherein the generating the plurality of test cases is performed automatically in response to the performing of the generating the plurality of test models.

14. The method of claim 1, wherein the receiving comprises automatically extracting the plurality of search conditions from the search screen, wherein the search screen is a search screen of a specification document stored in a specification document database so that the plurality of search conditions are an extracted plurality of search conditions extracted from the search screen stored in a specification document database, and further so that the generating a plurality of test models having factors based on the plurality of search conditions and levels having one or more of the search conditions includes generating a plurality of test models having factors based on the extracted plurality of search conditions extracted from the search screen stored in a specification database and levels having one or more of the search conditions, and further so that the generating a plurality of test cases based on the generated plurality of test models having the factors based on the plurality of search conditions and the levels having one or more of the search conditions includes generating a plurality of test cases based on the generated plurality of test models having the factors based on the extracted plurality of search conditions extracted from the search screen stored in a specification database and the levels having one or more of the search conditions, and wherein the generating the plurality of test models is performed automatically in response to the performing of the receiving, and wherein the generating the plurality of test cases is performed automatically in response to the performing of the generating the plurality of test models.

15. A computer program product comprising:

a non-transitory computer readable storage medium readable by one or more processing unit and storing instructions for execution by the one or more processor unit for performing a method for detecting defects in an online system, the method comprising:

receiving a plurality of search conditions regarding a search screen of the online system;

generating a plurality of test models having factors based on the plurality of search conditions and levels having one or more of the search conditions;

generating a plurality of test cases based on the generated plurality of test models having the factors based on the plurality of search conditions and the levels having one or more of the search conditions; and executing the plurality of test cases on the online system to detect defects in the online system, wherein the receiving comprises receiving at least one non-search conditions from the search screen of a specification document, and the generating comprises generating the plurality of test models having the at least one non-search condition as a factor and values of the non-search condition comprising levels.

16. The computer program product of claim 15 wherein the receiving comprises extracting the search conditions from the search screen.

17. The computer program product of claim 15 wherein a number of the plurality of test models is equal to the number of search conditions.

18. The computer program product of claim 15 wherein the generating comprises generating the plurality of test models wherein a factor of each test model is based on a different one of the plurality of search conditions, and the levels for each factor comprises a different combination of the plurality of search conditions.

19. A system comprising:
   a memory;
   one or more processor in communication with the memory; and
   program instructions executable by the one or more processor via the memory to perform a method for detecting defects in an online system, the method comprising:
   receiving a plurality of search conditions regarding a search screen of the online system;
   generating a plurality of test models having factors based on the plurality of search conditions and levels having one or more of the search conditions;
   generating a plurality of test cases based on the generated plurality of test models having the factors based on the plurality of search conditions and the levels having one or more of the search conditions; and
   executing the plurality of test cases on the online system to detect defects in the online system, wherein the receiving comprises receiving at least one non-search conditions from the search screen of a specification document, and the generating comprises generating the plurality of test models having the at least one non-search condition as a factor and values of the non-search condition comprising levels.

\* \* \* \* \*